(12) United States Patent
Kleindienst

(10) Patent No.: US 11,151,897 B1
(45) Date of Patent: Oct. 19, 2021

(54) SPEECH-LANGUAGE PATHOLOGY TEACHING SYSTEM

(71) Applicant: Lori Kleindienst, Farmington, CT (US)

(72) Inventor: Lori Kleindienst, Farmington, CT (US)

( * ) Notice: Subject to any disclaimer, the term of this patent is extended or adjusted under 35 U.S.C. 154(b) by 0 days.

(21) Appl. No.: 17/138,904

(22) Filed: Dec. 31, 2020

(51) Int. Cl.
*G09B 19/00* (2006.01)
*G09B 5/06* (2006.01)

(52) U.S. Cl.
CPC ............. *G09B 19/00* (2013.01); *G09B 5/065* (2013.01)

(58) Field of Classification Search
None
See application file for complete search history.

(56) References Cited

U.S. PATENT DOCUMENTS

| | | | |
|---|---|---|---|
| 2015/0206445 A1* | 7/2015 | Modde | G09B 5/06 434/362 |
| 2017/0084189 A1* | 3/2017 | Rubalcaba | G09B 19/00 |

* cited by examiner

*Primary Examiner* — James B Hull
(74) *Attorney, Agent, or Firm* — RC Trademark Company

(57) ABSTRACT

According to some embodiments, a speech-language pathology teaching system comprises a patient device and a teaching server. The patient device transmits a teaching target to the teaching server where the teaching target comprises speech production, articulation, language, or fluency. The teaching server to receive teaching target and implement a teaching program that displays a fisherman that catches a fish or a non-fish item. The non-fish item may be related to the teaching target.

14 Claims, 8 Drawing Sheets

SPEECH-LANGUAGE PATHOLOGY TEACHING SYSTEM

BACKGROUND

Speech-language pathology ("SLP") relates to the evaluation, diagnosis, and treatment of communication disorders (speech disorders and language disorders), cognitive-communication disorders, voice disorders, and swallowing disorders. Patients tend to be either young (e.g., birth to three) or have some form of disorder (e.g., autism spectrum disorder).

Working with young patients can be difficult in getting them to focus and stay engaged with a therapy session. Traditionally, to help students stay focused, in person play is often used by a pathologist to help patients stay engaged in learning. However, in a socially distanced society, in person play therapy is not available. It would therefore be desirable to provide a system that allows for remote play therapy that also helps patients to stay focused and engaged in the therapy session.

SUMMARY

Some embodiments described herein relate to a speech-language pathology teaching system. The speech-language pathology teaching system comprises a patient device and a teaching server. The patient device transmits a teaching target to the teaching server where the teaching target comprises speech production, articulation, language, or fluency. The teaching server receives the teaching target and implements a speech-language pathology teaching program to display a fisherman that catches a fish or a non-fish item.

DETAILED DESCRIPTION

In the following detailed description, numerous specific details are set forth in order to provide a thorough understanding of the embodiments. However, it will be understood by those of ordinary skill in the art that the embodiments may be practiced without these specific details. In other instances, well-known methods, procedures, components and circuits have not been described in detail so as not to obscure the embodiments.

Figure 1:
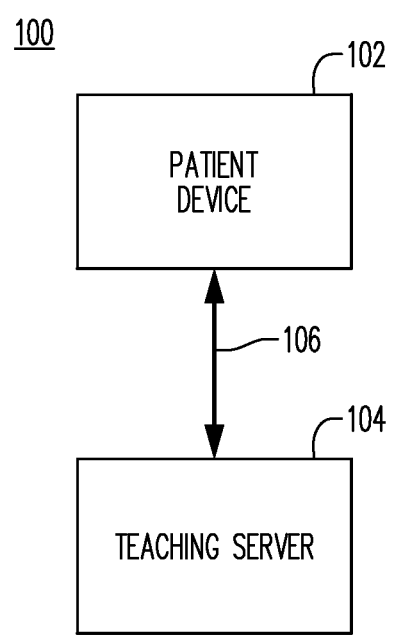
FIG. 1 illustrates a speech-language pathology teaching system in accordance with some embodiments.

The present embodiments relate to a speech-language pathology teaching system for remote patients but, in some embodiments, the speech-language pathology teaching system could be used on computers, smart boards or on tablets for in-person therapy. As illustrated in FIG. 1, a speech-language pathology teaching system 100 comprises a patient device 102 (e.g., a phone, a tablet, a desktop computer or a laptop computer, smart board, or smart device) that is connected via a computer network 106 with a teaching server 104. The network 106 may comprise, but is not limited to, a wired and/or wireless mesh network, a LAN, a MAN, or a WAN. The teaching server 104, which will be described in more detail with respect to FIG. 7, may comprise a computing device that may store and execute a speech-language pathology teaching program.

Figure 2:
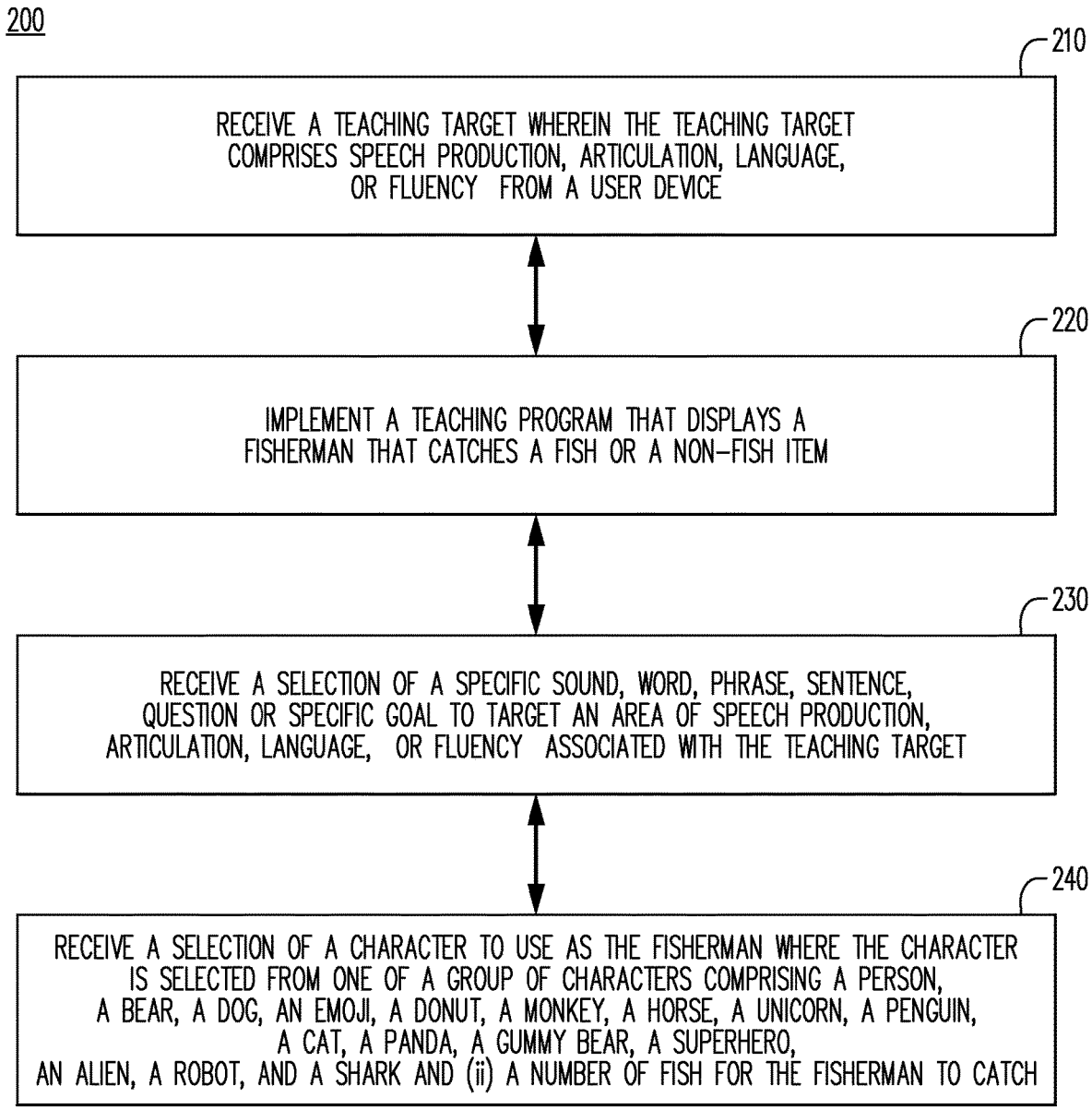
FIG. 2 illustrates a method according to some embodiments.

Now referring to FIG. 2, a method 200 that might be performed by a teaching server, such as the teaching server 106, described with respect to FIG. 1, is illustrated according to some embodiments. The method described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

Method 200 may relate to implementing a speech-language pathology teaching program for displaying a fisherman that catches a fish or a non-fish item which functions as a teaching system to allow for remote play therapy. The embodiments described herein also help patients stay focused and engaged in the therapy session.

Now referring to 210, a teaching target may be received at a teaching server. The teaching target may relate to a selection of a session type that is associated with speech production, articulation, language, or fluency and the teaching target may be received from a patient device. The selection of the teaching target may be made by a speech-language pathologist, a patient or a guardian of the patient.

In response to the selection of the teaching target, the teaching server may implement a teaching program that displays a fisherman in a scene with water at 220. In some embodiments, the teaching server may implement a teaching program that displays a fisherman in a scene with ice at 220 so that the fisherman may be displayed ice fishing. At 230, the teaching server may receive, from the patient device, a selection of a specific sound, word, phrase, sentence, question or specific goal associated with targeting an area of speech production, articulation, language, or fluency which is associated with the teaching target.

For purposes of illustrating features of the present embodiments, some simple examples will now be introduced and referenced throughout the disclosure. Those skilled in the art will recognize that these examples are illustrative and are not limiting and are provided purely for explanatory purposes. In some embodiments, a patient may select to work on pronouncing and saying words that being with the letter B (e.g., a B sound—/b/phoneme).

Figure 3:
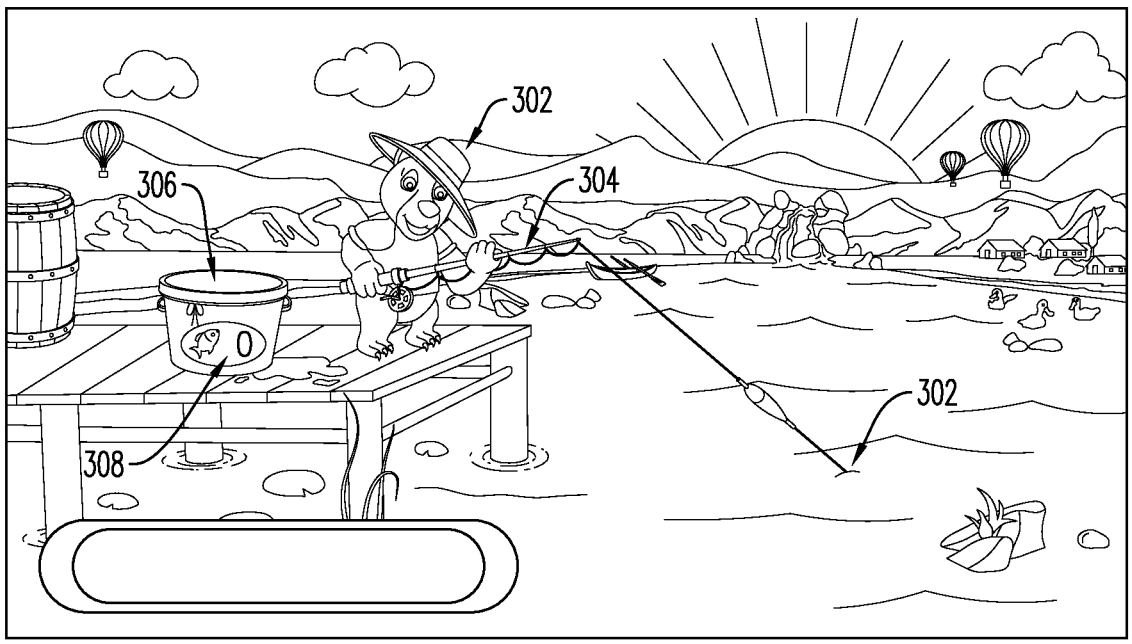
FIG. 3 illustrates a speech-language pathology teaching screen in accordance with some embodiments.

Referring now to FIG. 3, an embodiment of a speech-language pathology teaching screen 300 is illustrated. In the illustrated embodiment, the fisherman 302 is illustrated as a cartoonish bear. However, in other embodiments, the fisherman may be characterized as a variety of cartoonish characters. For example, the patient device may transmit a selection of a character to use for the fisherman 302 where the character is selected from one of a group of characters comprising, but not limited to, a human (e.g., a person), a bear, a dog, an emoji, a donut, a monkey, a horse, a unicorn, a penguin, a cat, a panda, a gummy bear, a superhero, an alien, a robot, and a shark. The patient device may also transmit, to the teaching server, a number of fish for the fisherman to catch which determines how long the therapy session will last since the session will end when the number of fish indicated are caught. Thus, and referring back to FIG. 2, at 240, the teaching server may receive a selection of a character to use as the fisherman. Also, at 240, the teaching server may receive the number of fish for the fisherman to catch. After casting his hook into the water, the fisherman either catches a fish or a non-fish item.

As stated above, the selection of the number of fish to catch may determine a length of time that a patient uses the program since fish and non-fish items are selected at random and the program ends once the number of fish are caught. In some embodiments, whenever the fisherman casts their rod they have between a 20% and 50% chance of catching a fish. The remaining 50% to 80% of the time a non-fish item will be caught and the non-fish items may be used by the patient to practice sounds, words, phrases, or sentences, practice reading, or answering questions.

Continuing with the above example, and referring to FIG. 3, FIG. 4, FIG. 5, and FIG. 8 an embodiment of speech-language pathology teaching screens 300, 400, 500 and 800 are illustrated. In the present example, the fisherman 302 is disclosed as a bear character holding a fishing pole 304. Any fish caught by the fisherman 302 may be stored in a bucket 306 and the bucket 306 may indicate a number of fish caught by displaying the number of fish on an outside 308 of a bucket 306.

Figure 4:
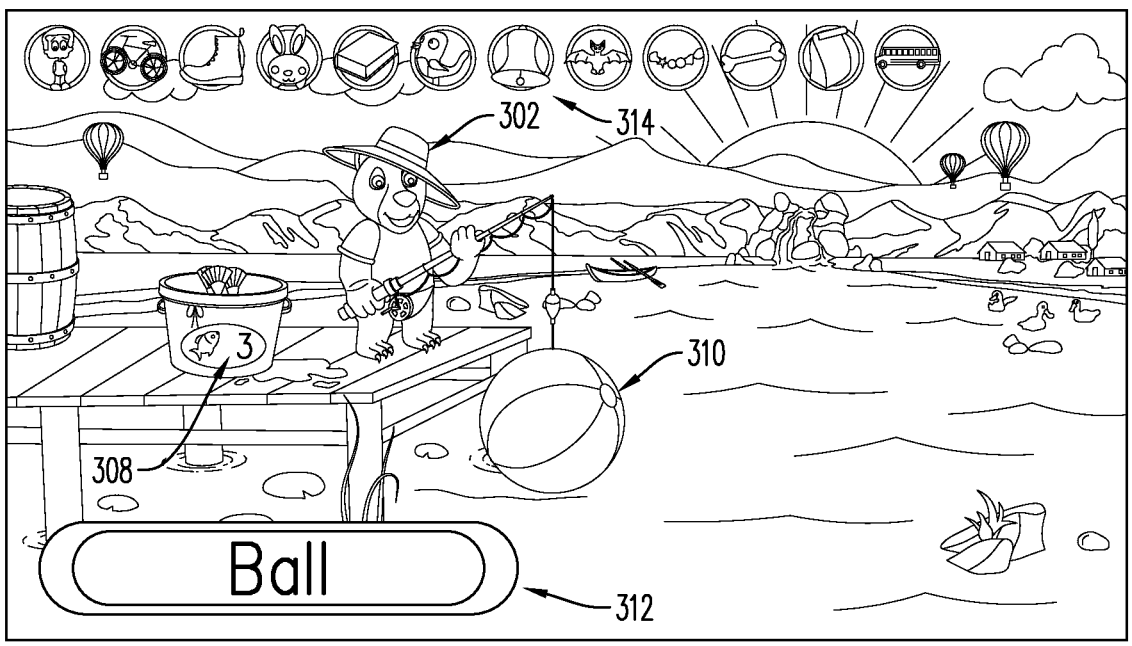
FIG. 4 illustrates a speech-language pathology teaching screen in accordance with some embodiments.
Figure 5:
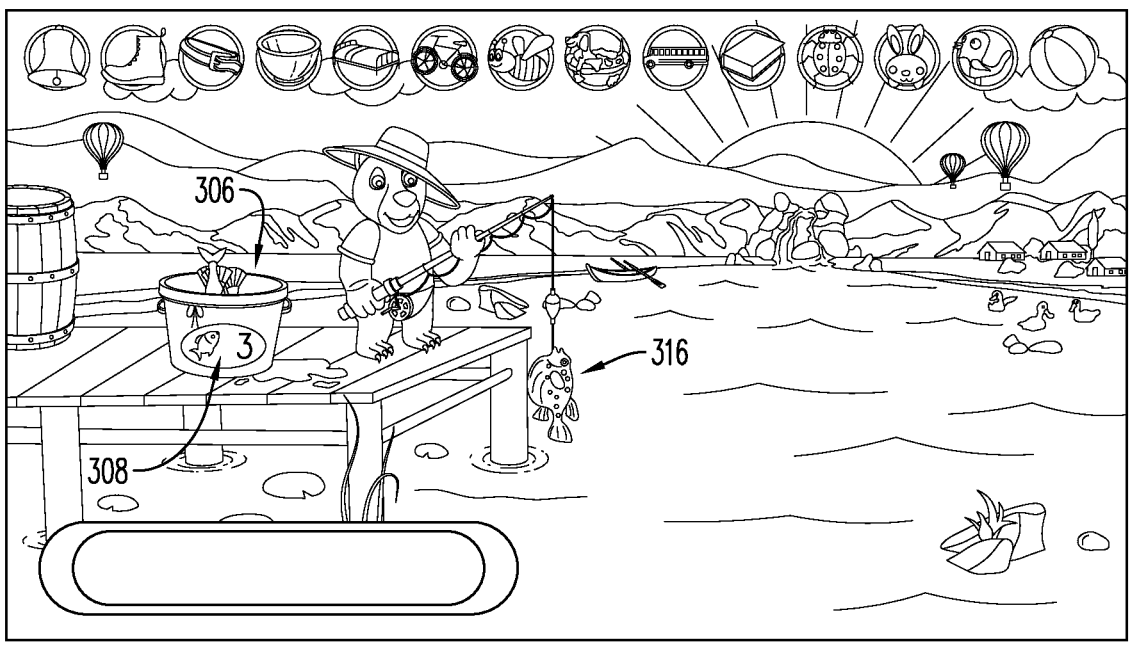
FIG. 5 illustrates speech-language pathology teaching screen according to some embodiments.

In practice, a patient may select a location on the screen 300 by either physically touching the location (e.g., a touch screen) or using a pointing device like a mouse. In response to the selection of an area of the screen 300, the fisherman 302 may automatically cast his line to the location on the screen 300. Using a random number generator, associated with a computer processor within the teaching server, the teaching server may randomly determine if the fisherman 302 catches a fish 316 or a non-fish item 310 (e.g., a 30% chance of a fish and a 70% chance of a non-fish item). The teaching server may store a plurality of different fish that may be displayed (e.g., 30 different fish). The non-fish item 310 may be associated with the teaching target. The fish 316 or the non-fish item 310 associated with the teaching target may appear on a hook caught by the fisherman 302 as illustrated in FIG. 4 and FIG. 5 in response to the patient select a location on the screen 300.

The non-fish 310 item associated with the teaching target relates to a speech-language pathology therapy target word, phrase, sentence, or question. In some embodiments, the non-fish item 310 associated with the teaching target is an image of an object associated with the teaching target and is displayed on the display screen (e.g., screen 400 or 500) and is selected in response to the non-fish item 310 being caught.

Figure 8:
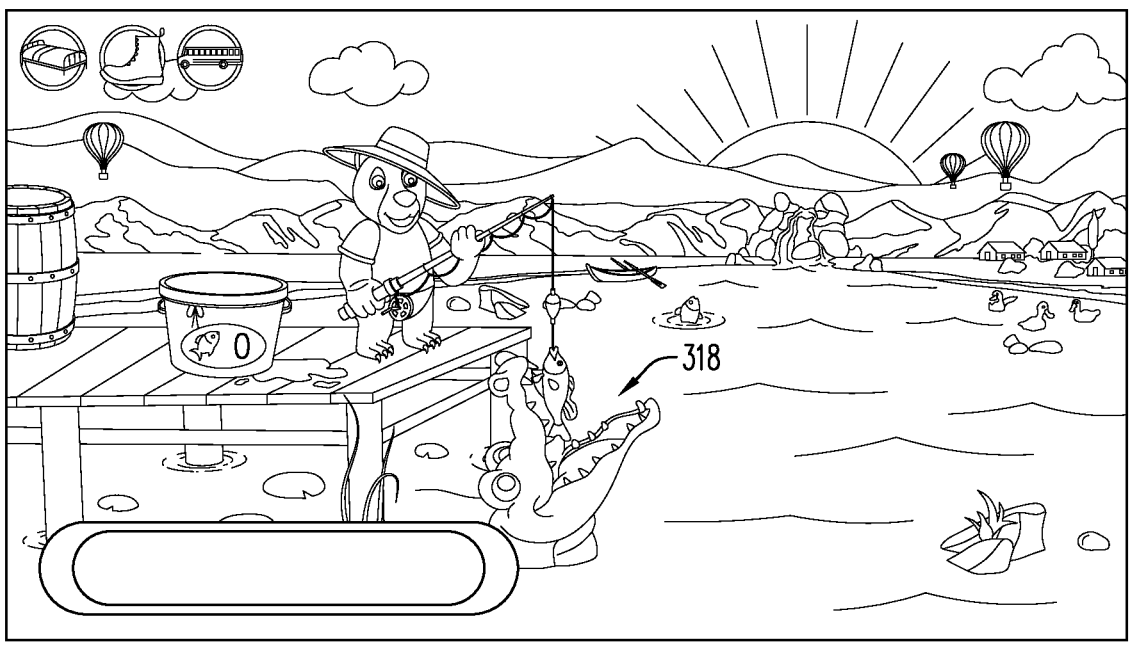
FIG. 8 illustrates speech-language pathology teaching screen according to some embodiments.

Continuing with the above example, a patient selects a first location on screen 400 (e.g., a touch screen) by pressing the location on the screen and the fisherman 302 casts a line to that location. Pressing the location on the screen also (i) sends screen coordinates to the teacher server and (ii) initiates a speech-language pathology teaching routine that randomly select a fish 316 or a non-fish item 310. The fish 316, for example, may be selected from a group of 30 images of cartoon fish and one of the group of 30 may be randomly selected and then displayed on the display screen 500. Similarly, the non-fish item 310 may comprise a group of images related to a sound, a therapy target word, a phrase, a sentence, or a question. The fish 310 and the non-fish item 316 may be stored in a JSON format map on the teaching server. In some embodiments, a variety of image files may be stored on the teaching server which are retrieved based on randomly determining, via a processor, if an image file of a fish or an image file or a non-fish will be displayed, on a display screen, a patient. In some embodiments, motion, or reactions, associated with the fisherman may comprise a plurality of image files that are loaded in sequence, via the processor, and are then displayed on the display screen. For example, in the case that a crocodile steals a fish (as illustrated in FIG. 8), the expression of the fisherman may be changed by loading a specific image file that shows surprise on the fisherman's face. These images may be transmitted over a computer network to be displayed on the patient's display screen.

In the example of screen 400, the fisherman 302 has caught a non-fish item 310 which is a ball (e.g., an image of a ball). In response to catching the non-fish item 310, a display area 312 may illustrate a word associated with, or corresponding to, the non-fish item 310. Thus, in the present example when the fisherman 302 catches a ball, the word "Ball" is displayed in the display area 312.

As illustrated in FIG. 5, each fish 316 that is caught increments the display on the outside 308 on the bucket 306. Furthermore, after the fish 316 is displayed on the hook for a predetermined amount of time, the fish may be displayed as being in the bucket 306 and a display on an outside 308 of the bucket 306 may be incremented to indicate a total number of fish caught. In some embodiments, and to add excitement to the teaching program, the teacher server may randomly determine a crocodile 318 that is to be displayed and the crocodile may be illustrated as stealing the fish 316 that is currently on the hook (See FIG. 8). Alternatively, in an embodiment related to ice fishing, an image of a polar bear or a penguin may be illustrated as stealing the fish 316. In this embodiment, the outside 308 of the bucket 306 may not be incremented and the therapy program continues.

A patient may be determined to win (e.g., complete) the therapy session once the patient catches the selected number of fish. In response to catching the selected number of fish 316, the fish 316 may be displayed as coming out of the bucket 316 and dancing on the screen. In some embodiments, the fish may dance to music.

After a patient is done working with a non-fish item 310 each non-fish item 310 may be moved to a storage area 314 of the screen (e.g., top of the screen as illustrated in FIG. 4) where each non-fish items 310 may be manually selected for practice before ending a therapy session.

Figure 6:
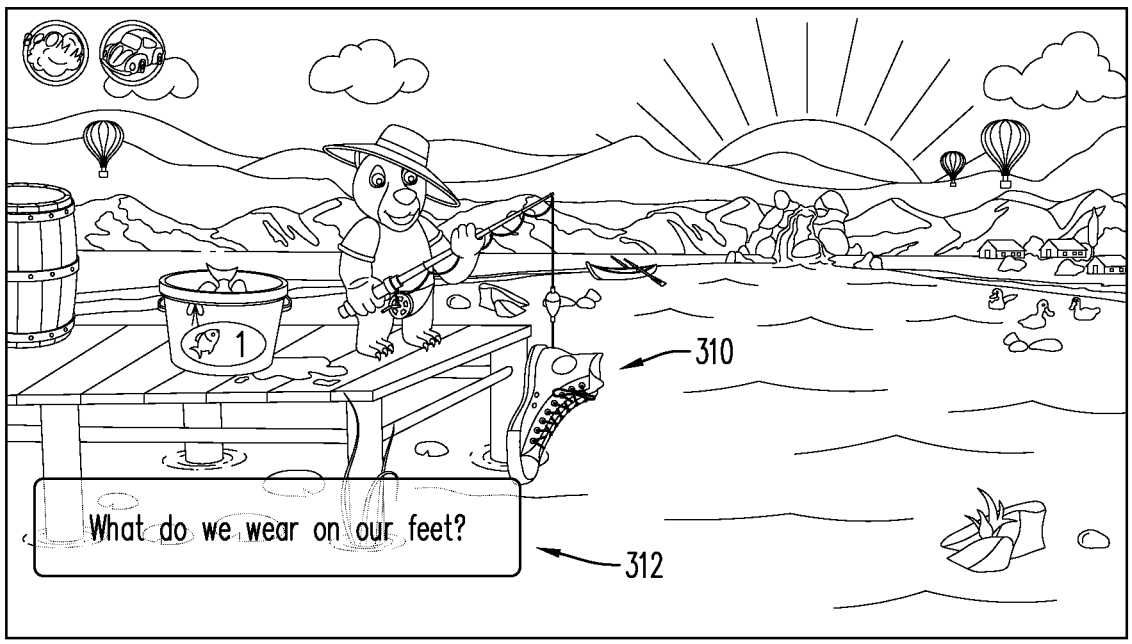
FIG. 6 illustrates speech-language pathology teaching screen according to some embodiments.

Referring to FIG. 6, an embodiment of a speech-language pathology teaching screen 600 is illustrated. Screen 600 illustrates that in response to catching a non-fish item 310, a display area 312 may illustrate a question associated with, or corresponding to, the non-fish item 310. The patient may then then answer the question which may be transmitted to the teaching server in some embodiments. In some embodiments, the questions may serve as another tool for the patient to pronounce one or more words or answer questions associated with the displayed image of the non-fish item 310.

Figure 7:
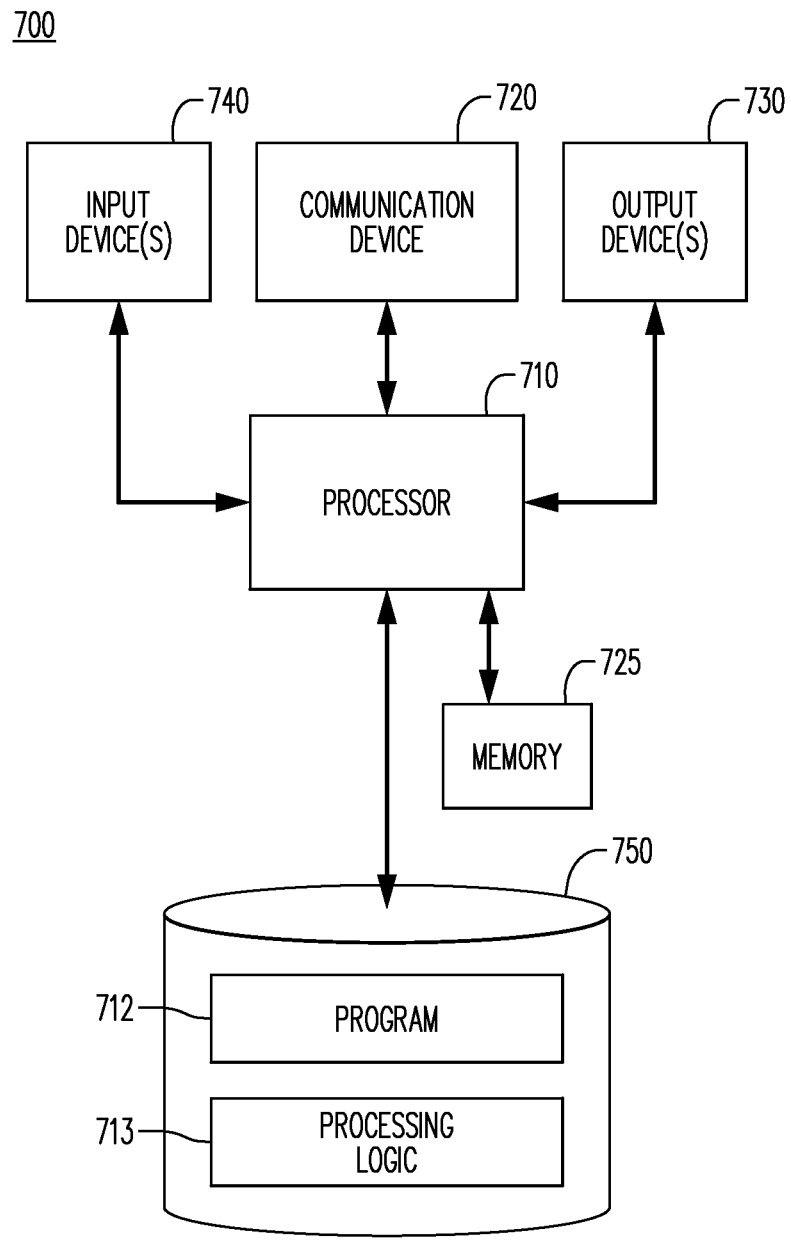
FIG. 7 illustrates a teaching server according to some embodiments.

Note the embodiments described herein may be implemented using any number of different hardware configurations. For example, FIG. 7 illustrates a teaching server 700 that may be, for example, associated with the system 100 of FIG. 1. The teaching server 700 may provide a technical and commercial advantage by being able to implement a system that allows for remote play therapy that also helps patients to stay focused and engaged in a therapy session.

The teaching server 700 may comprise a processor 710 ("processor"), such as one or more commercially available Central Processing Units (CPUs) in the form of one-chip microprocessors, coupled to a communication device 720 configured to communicate via a communication network (not shown in FIG. 7). The communication device 720 may be used to communicate, for example, with one or more patient devices on a network. The teaching server 700 further includes an input device 740 (e.g., a mouse and/or keyboard to enter information about non-fish items) and an output device 370 (e.g., to output and display any alerts).

The processor 710 also communicates with a memory 725 and storage device 350 that stores data 713. The storage device 350 may comprise any appropriate information storage device, including combinations of magnetic storage devices (e.g., a hard disk drive), optical storage devices, mobile telephones, and/or semiconductor memory devices. The storage device 350 may store a program 712 and/or processing logic 713 for controlling the processor 710. The processor 710 performs instructions of the programs 712, 713, and thereby operates in accordance with any of the embodiments described herein. For example, the processor 710 may receive data from a timer integral to the processor 710 and may institute a failsafe action via the instructions of the programs 712 and processing logic 713.

The programs 712, 713 may be stored in a compiled, compressed, uncompiled and/or encrypted format or a combination. The programs 712, 713 may furthermore include other program elements, such as an operating system, a database management system, and/or device drivers used by the processor 710 to interface with peripheral devices.

As will be appreciated by one skilled in the art, the present embodiments may be embodied as a system, method or computer program product. Accordingly, the embodiments described herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments described herein may take the form of a computer program product embodied in one or more computer readable medium(s) having computer readable program code embodied thereon.

The process flow and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

This written description uses examples to disclose multiple embodiments, including the preferred embodiments, and also to enable any person skilled in the art to practice the invention, including making and using any devices or systems and performing any incorporated methods. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed:

1. A speech-language pathology teaching system, the system comprising:
    a patient device to transmit (i) a selection of a character to use as a fisherman, (ii) a number of fish for the fisherman to catch, (iii) a selection of an area on a display screen, the selection comprising screen coordinates based on a user physically touching the area on the display screen or via using a pointing device to indicate the area and (iv) a teaching target wherein the teaching target comprises a selection of a session type associated with speech production, articulation, language, or fluency; and
    a teaching server to (A) receive (i) the selection of a character to use as the fisherman, (ii) the number of fish for the fisherman to catch, (iii) the selection of an area on a display screen comprising screen coordinates that are based on a user physically touching the area on the display screen or via using a pointing device indicating the area and (iv) the teaching target and to (B) implement, via a processor, a teaching program based on the received teaching target and the number of fish for the fisherman to catch that displays to a patient, on the patient device, the fisherman that catches a fish or a non-fish item associated with the session type wherein in response to the selection of the area on the display screen, (i) the teaching server initiates, via the processor, a speech-language pathology teaching routine that randomly selects the fish or the non-fish item for each cast and (ii) the processor causes the patient device to display the fisherman automatically casting a line, via the processor, to the area on the display screen based on the transmitted screen coordinates, displaying the randomly selected fish or non-fish item, wherein a length of time that a teaching routine lasts is based on the number of fish that the fisherman catches and, wherein the teaching routine terminates when the fisherman catches the selection of the number of fish for the fisherman to catch.

2. The speech-language pathology teaching system of claim 1, wherein the patient device further transmits a selection of a specific sound, word, phrase, sentence, question or specific goal to target an area of speech production, articulation, language, or fluency associated with the teaching target to the teaching server.

3. The speech-language pathology teaching system of claim 1, wherein the teaching server randomly determines whether a fish, or a non-fish item associated with the teaching target will be caught by the fisherman, wherein the fish or the non-fish item associated with the teaching target appears on a hook caught by the fisherman.

4. The speech-language pathology teaching system of claim 3, wherein the non-fish item associated with the teaching target is a speech-language pathology therapy target sound, word, phrase, sentence, or question.

5. The speech-language pathology teaching system of claim 3, wherein the non-fish item associated with the teaching target is an image of an object associated with the teaching target on the display screen in response to the non-fish item being caught.

6. The speech-language pathology teaching system of claim 5, wherein an instruction associated with the image of an object associated with the teaching target is transmitted to the display screen and, in response to an indication that the instruction was followed, the image of the object associated with the teaching target is displayed at a new location on the display screen.

7. The speech-language pathology teaching system of claim 5, wherein the non-fish item is the image of an object associated with the teaching target and appears displayed on the display screen in response to the non-fish item being caught.

8. The speech-language pathology teaching system of claim 4, wherein in a case that a fish is caught, the caught fish is displayed on the display screen on the hook and is then displayed as being in a bucket after a predetermined amount of time where the bucket displays a total number of fish caught.

9. The speech-language pathology teaching system of claim 8, wherein the teacher server randomly determines a crocodile to be displayed and to be displayed as stealing a fish that is currently on the hook.

10. The speech-language pathology teaching system of claim 4, wherein a player is determined to win once the player catches the determined number of fish and, in response to determining that the player won, the fish are displayed as coming out of the bucket and dancing.

11. The speech-language pathology teaching system of claim 1, wherein the fish and the non-fish item are stored in a JSON format map on the teaching server.

12. A method of speech-language pathology teaching, the method comprising: receiving, at a teaching server, (i) a number of fish for a fisherman to catch, (ii) a selection of an area on a display screen comprising screen coordinates that are based on a user physically touching the area on the display screen or via using a pointing device indicating the area and (iii) a teaching target from a patient device wherein the teaching target comprises a selection of a session type associated with speech production, articulation, language, or fluency; receiving, from the patient device at the teaching server, a selection of a specific sound, word, phrase, sentence, question or specific goal to target an area of speech production, articulation, language, or fluency associated with the teaching target; receiving a selection of a character to use as the fisherman where the character is selected from one of a group of characters comprising a person, a bear, a dog, an emoji, a donut, a monkey, a horse, a unicorn, a penguin, a cat, a panda, a gummy bear, a superhero, an alien, a robot, and a shark and (ii) a number of fish for the fisherman to catch; and in response to the selection of the area on the display screen, (i) initiating, via the processor, a speech-language pathology teaching routine that randomly selects the fish or a non-fish item for each cast and (ii) the processor causes the patient device to display the fisherman automatically casting a line, via the processor, to the area on the display screen based on the transmitted screen coordinates, displaying the randomly selected fish or non-fish item, wherein a length of time that a teaching routine lasts is based on the number of fish that the fisherman catches and, wherein the teaching routine terminates when the fisherman catches the selection of the number of fish for the fisherman to catch.

13. The method of claim 12, wherein in response to the selection of the area on the display screen, the fisherman automatically casts a line to the area on the display screen and further comprising: randomly determining a crocodile, polar bear, or penguin to be displayed as stealing a fish caught by the fisherman.

14. A non-transitory computer-readable medium comprising processor steps that when executed by a processor perform a method of speech-language pathology teaching, the method comprising: receiving, at a teaching server, (i) a number of fish for a fisherman to catch, (ii) a selection of an area on a display screen comprising screen coordinates that are based on a user physically touching the area on the display screen or via using a pointing device indicating the area and (iii) a teaching target from a patient device wherein the teaching target comprises a selection of a session type associated with speech production, articulation, language, or fluency; receiving, from the patient device at the teaching server, a selection of a specific sound, word, phrase, sentence, question or specific goal to target an area of speech production, articulation, language, or fluency associated with the teaching target; receiving a selection of a character to use as the fisherman where the character is selected from one of a group of characters comprising a person, a bear, a dog, an emoji, a donut, a monkey, a horse, a unicorn, a penguin, a cat, a panda, a gummy bear, a superhero, an alien, a robot, and a shark and (ii) a number of fish for the fisherman to catch; and in response to the selection of the area on the display screen, (i) initiating, via the processor, a speech-language pathology teaching routine that randomly selects the fish or a non-fish item for each cast and (ii) the processor causes the patient device to display the fisherman automatically casting a line, via the processor, to the area on the display screen based on the transmitted screen coordinates, displaying the randomly selected fish or non-fish item, wherein a length of time that a teaching routine lasts is based on the number of fish that the fisherman catches and, wherein the teaching routine terminates when the fisherman catches the selection of the number of fish for the fisherman to catch.

* * * * *